US009529220B2

(12) United States Patent
Ito et al.

(10) Patent No.: US 9,529,220 B2
(45) Date of Patent: Dec. 27, 2016

(54) ELECTRO-OPTICAL DEVICE, PROJECTION-TYPE DISPLAY DEVICE, ELECTRONIC DEVICE, AND MANUFACTURING METHOD OF THE ELECTRO-OPTICAL DEVICE

(71) Applicant: Seiko Epson Corporation, Tokyo (JP)

(72) Inventors: Satoshi Ito, Eniwa (JP); Takafumi Egami, Chitose (JP); Hidenori Sokabe, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/794,735

(22) Filed: Jul. 8, 2015

(65) Prior Publication Data

US 2015/0323828 A1    Nov. 12, 2015

Related U.S. Application Data

(63) Continuation of application No. 13/551,828, filed on Jul. 18, 2012, now Pat. No. 9,110,325.

(30) Foreign Application Priority Data

Jul. 21, 2011  (JP) ................ 2011-159619

(51) Int. Cl.
  *G02F 1/136*    (2006.01)
  *G02F 1/1333*   (2006.01)
  (Continued)

(52) U.S. Cl.
  CPC ... *G02F 1/133345* (2013.01); *G02F 1/134309* (2013.01); *G02F 1/136213* (2013.01);
  (Continued)

(58) Field of Classification Search
  CPC combination set(s) only.
  See application file for complete search history.

(56) References Cited

U.S. PATENT DOCUMENTS 8,269,907 B2      9/2012 Kim et al.
2005/0062042 A1   3/2005 Hayashi et al.
(Continued)

FOREIGN PATENT DOCUMENTS

JP    2003-295220 A    10/2003
JP    2005-092122 A    4/2005
(Continued)

OTHER PUBLICATIONS

Non-Final Office Action received in U.S. Appl. No. 13/551,828, Jun. 19, 2014.
(Continued)

*Primary Examiner* — Wen-Ying P Chen
(74) *Attorney, Agent, or Firm* — ALG Intellecual Property, LLC

(57) ABSTRACT

In the electro-optical device, a pillar-shaped protrusion is formed on an insulating film (a first insulating film) provided below a pixel electrode in the downward direction, and thus a conduction section of a second electrode layer (a conductive layer) overlaps the highest surface of the pillar-shaped protrusion. An inter-layer insulating film (a second insulating film) is provided between the second electrode layer and the pixel electrode, but the conduction section is exposed on a surface of the inter-layer insulating film. For this reason, the pixel electrode is electrically connected to the conduction section, when the pixel electrode is laminated on the inter-layer insulating film.

17 Claims, 7 Drawing Sheets

(51) Int. Cl.
*G02F 1/1343* (2006.01)
*H04N 9/31* (2006.01)
*G02F 1/1362* (2006.01)
*G02F 1/1368* (2006.01)

(52) U.S. Cl.
CPC ..... *G02F 1/136227* (2013.01); *H04N 9/3102*
(2013.01); *G02F 2001/13685* (2013.01); *G02F 2001/133357* (2013.01)

(56) References Cited

U.S. PATENT DOCUMENTS

| | | |
|---|---|---|
| 2006/0226423 A1 | 10/2006 | Yamasaki |
| 2008/0129908 A1 | 6/2008 | Nomura et al. |
| 2008/0316400 A1 | 12/2008 | Sato |
| 2009/0059144 A1 | 3/2009 | Lin et al. |

FOREIGN PATENT DOCUMENTS

| | | |
|---|---|---|
| JP | 2006-317903 A | 11/2006 |
| JP | 2007-057847 A | 3/2007 |
| JP | 2007-310152 A | 11/2007 |
| JP | 2008-139619 A | 6/2008 |
| JP | 2011-64849 A | 3/2011 |

OTHER PUBLICATIONS

Final Office Action received in U.S. Appl. No. 13/551,828, Jan. 12, 2015.

Notice of Allowance and Notice of Allowability received in U.S. Appl. No. 13/551,828, Apr. 16, 2015.

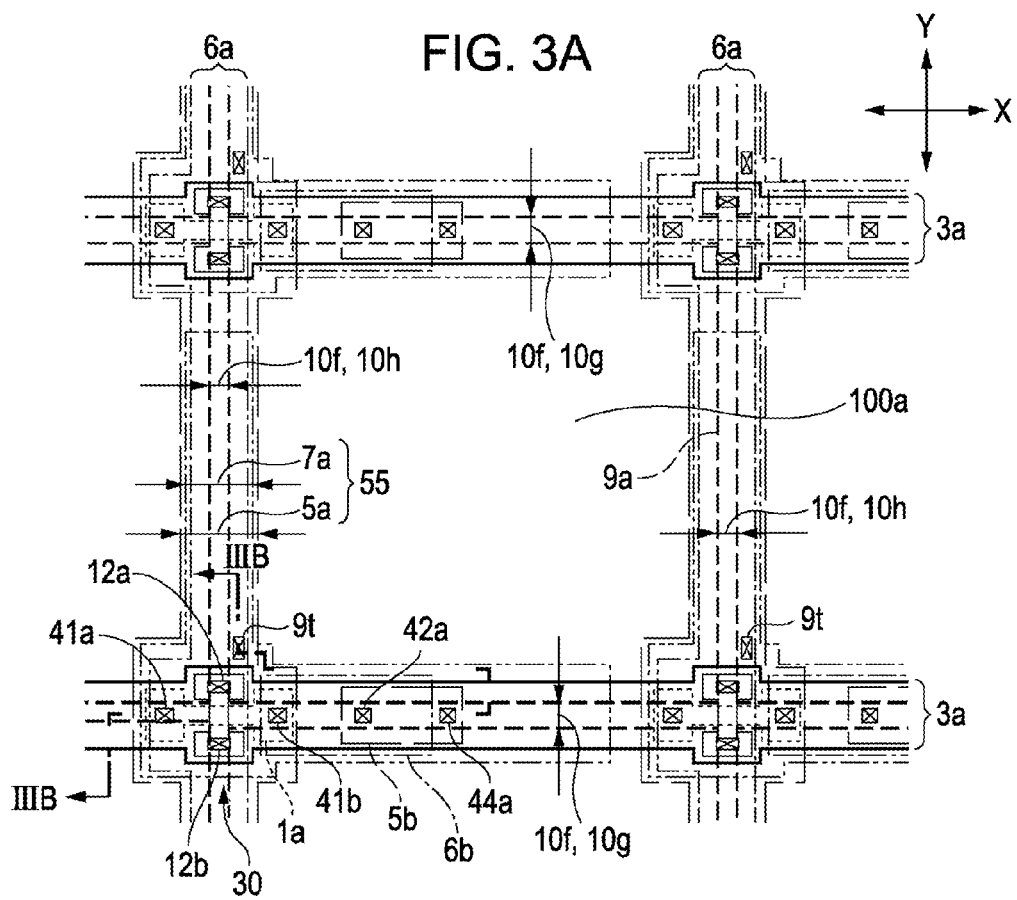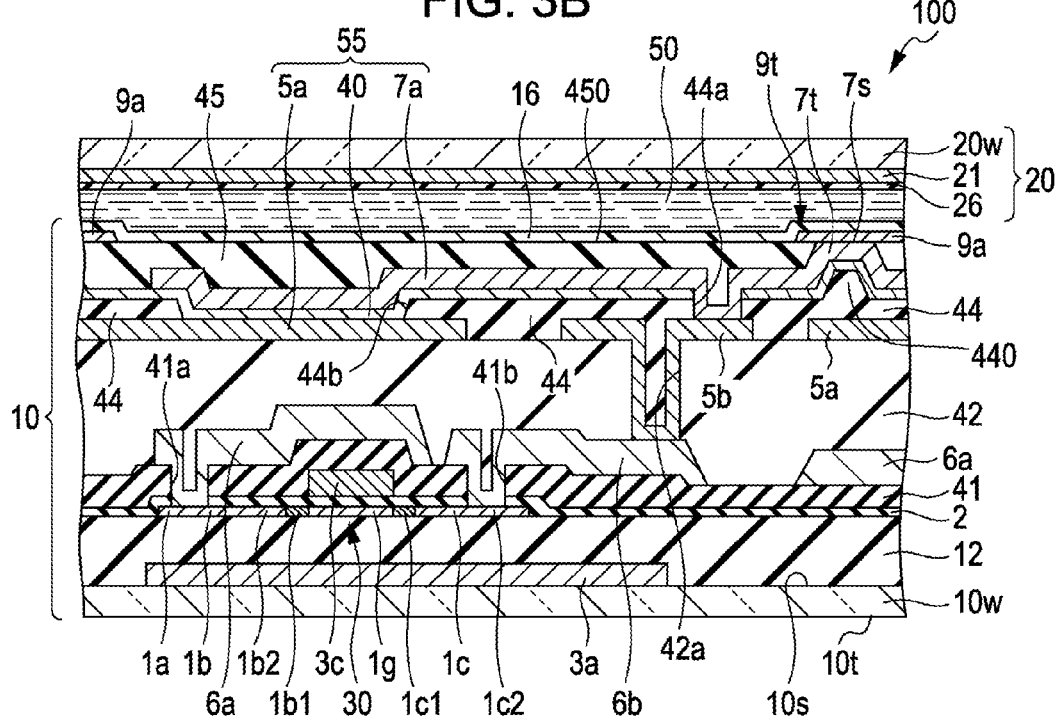

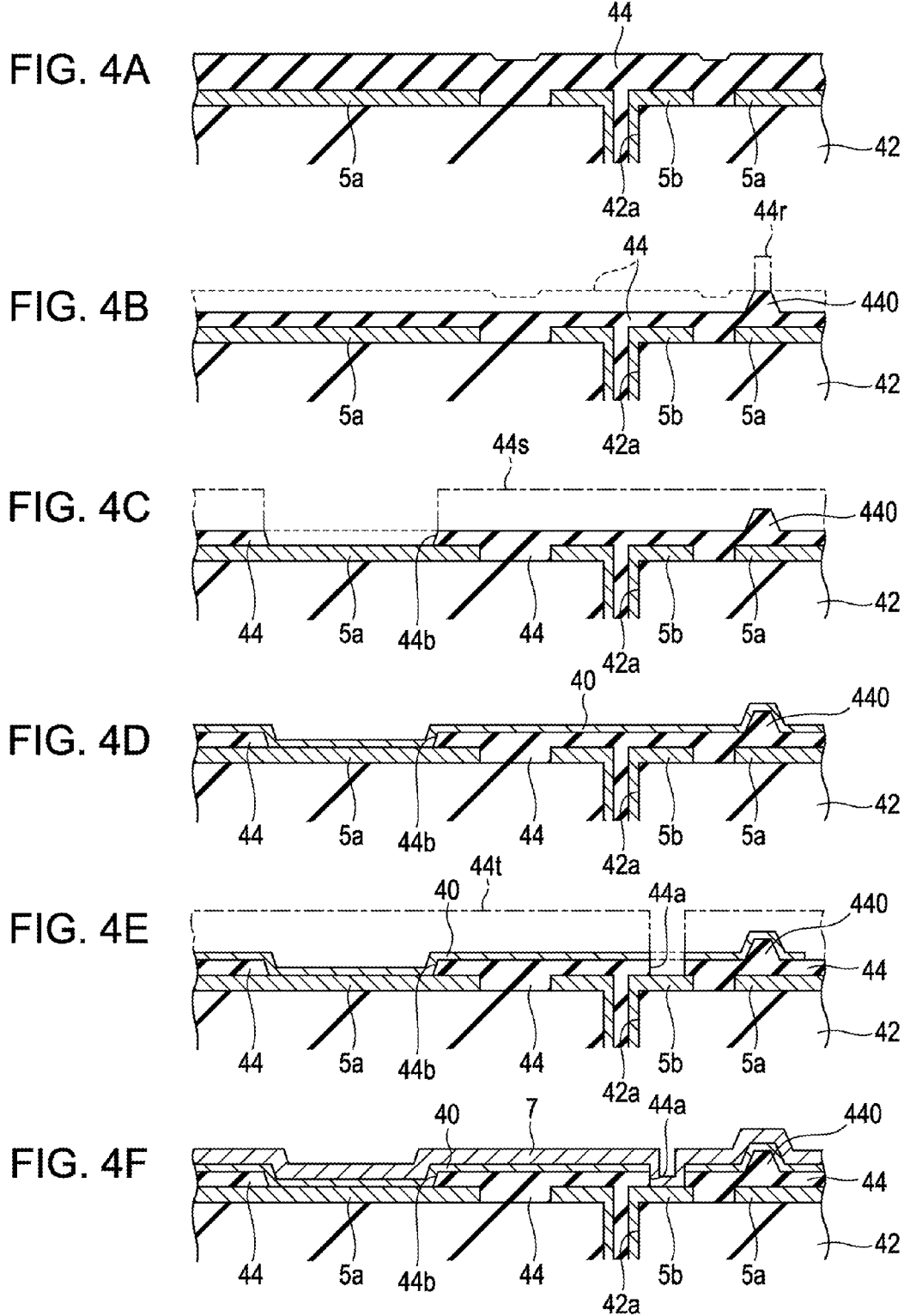

ND MANUFACTURING METHOD OF THE
ELECTRO-OPTICAL DEVICE, PROJECTION-TYPE DISPLAY DEVICE, ELECTRONIC DEVICE, AND MANUFACTURING METHOD OF THE ELECTRO-OPTICAL DEVICE

The present application is a continuation application of U.S. patent application Ser. No. 13/551,828 filed on Jul. 18, 2012, which claims priority from Japanese Patent Application No. 2011-159619 filed Jul. 21, 2011, which are expressly incorporated by reference herein.

BACKGROUND

1. Technical Field

The present invention relates to an electro-optical device including a liquid crystal device, a projection-type display device, and an electronic device, and more particularly to a peripheral configuration of pixel electrodes of the electro-optical device.

2. Related Art

The pixels with pixel electrodes are arranged in the matrix on an element substrate for use in the electro-optical device, such as a liquid crystal device and an organic electroluminescence device, and the pixel electrode is electrically connected to a conductive layer beneath the pixel electrode in the downward direction, through a contact hole formed in an insulating film (refer to JPA-2006-317903).

The contact hole in this electro-optical device is large in horizontal size, and the electro-optical device decreases in display grade. For example, the contact hole in a liquid crystal device is so large in horizontal size that a pixel electrode has a large depression and elevation on the surface. This prevents an oriented film from being formed in a suitable manner. Furthermore, in a transmission-type liquid crystal device, an amount of display light decreases because light cannot pass through the contact hole. Furthermore, an area of the depression and elevation does not contribute to display, because the reflection direction of light is in disorder there, when the pixel electrode has the large depression and elevation on the surface in a reflection-type liquid crystal device.

On the other hand, a configuration is commonly employed that buries a plug in a contact hole in an inter-layer insulating film, and electrically connects the pixel electrode and an electrode beneath the pixel electrode (that is, in the downward direction), through this plug buried in the contact hole in the inter-layer insulating film (refer to JP-A-2011-64849). With this configuration, the contact hole is made smaller in horizontal size, thereby preventing the large depression and elevation from being formed on the surface of the pixel electrode.

However, in the conducting structure that uses the plug, it is necessary to additionally prepare a metal material, which is not in common use for the electro-optical device, such as tungsten, in order to form the plug. This increases the manufacturing cost. Furthermore, it is necessary to perform a step of sputtering metal to thicken a metal film for the plug and a step of smoothing an inter-layer insulating film by a chemical machinery polishing method, until the contact hole is filled. The sputtering step of these steps decreases productivity because it takes too much time to sputter metal to thicken the metal film for the plug.

SUMMARY

An advantage of some aspects of the invention is to provide an electro-optical device that has a conduction portion of a pixel electrode, not occupying a large area, formed by using a film formed for other purposes, and therefore has not a large depression and elevation on a surface of the pixel electrode, a projection-type display device, and an electronic device.

According to an aspect of the invention, there is provided a plurality of pixel electrodes provided over one side of a substrate, a first insulating film, provided between the substrate and the plurality of pixel electrodes, including pillar-shaped protrusions protruding toward the pixel electrodes in positions overlapping the pixel electrodes when viewed from above, a conductive layer, provided between the first insulating film and the pixel electrodes, including a conduction section overlapping highest surfaces of the pillar-shaped protrusions when viewed from above, and a second insulating film, provided between the conductive layer and the pixel electrodes, exposing one side of the conduction section, the one side in the direction of the pixel electrode, wherein the pixel electrodes are deposited on one side of the second insulating film, the one side in the direction of the pixel electrode, thereby resulting in the pixel electrode being electrically connected to the conduction section.

According to another aspect of the invention, there is provided a method of manufacturing an electro-optical device including forming a first insulating film over one side of a substrate, forming a pillar-shaped protrusion protruding upward on the first insulating film by partly etching a surface of the first insulating film, forming a conductive layer on the first insulating film including an area for forming the pillar-shaped protrusion, forming a second insulating film on the conductive layer, exposing as a conduction section a portion overlapping the highest surface of the pillar-shaped protrusion when viewed from above, in the conductive layer, by removing the second insulating film in the downward direction, and forming a pixel electrode on the second insulating film including the exposed portion of the conduction section.

The pillar-shaped protrusions, protruding toward the pixel electrodes in a position overlapping the pixel electrodes are formed on the first insulating film provided between the pixel electrodes and the substrate. These highest surfaces of the pillar-shaped protrusions overlap the conduction section of the conductive layer when viewed from above. Furthermore, the second insulating film is provided between the conductive layer and the pixel electrode, but the conduction section is exposed on the surface of the second insulating film in the direction of the pixel electrode. For this reason, the pixel electrodes are electrically connected to the conduction section, when the pixel electrodes are laminated on the second insulating film. For this reason, a contact portion is smaller in horizontal size, and the pixel electrode does not have a large depression and elevation on the surface, compared to the structure that connects the pixel electrode and the conductive layer by using a contact hole formed in the insulating film. Furthermore, the pixel electrode is electrically connected by using a film formed for other purposes in the electro-optical device, such as a conductive layer and an insulating film, and special metal for a plug does not need to be thickly deposited.

The surface of the conduction section in the direction of the pixel electrode and the surface of the second insulating film in the direction of the pixel electrode may make up one plane surface in succession. In this configuration, the pixel electrode is made to be formed on the plane surface.

The electro-optical device may further include a capacity electrode layer, provided between the conductive layer and the substrate, and a dielectric layer, provided between the capacity electrode layer and the conductive layer, with a storage capacitance being formed from the capacity electrode layer, the dielectric layer, and the conductive layer. That is, the pixel electrode may be electrically connected by using an electrode layer (the conductive layer) making up the storage capacitance.

In the electro-optical device, the first insulating film may be provided between the capacity electrode layer and the conductive layer, and an opening may be provided in an area where the capacity electrode layer and the conductive layer overlap each other when viewed from above. In this configuration, although the dielectric layer is thin, the short circuit between the highest portion of the first insulating film and the capacity electrode layer may be prevented by the first insulating film.

In the electro-optical device, in the pixel electrodes, the conductive layer and the capacity electrode layer may be provided in an area that overlaps an area between the adjacent pixel electrodes when viewed from above. In this configuration, since the conductive layer is positioned nearer the pixel electrode than the capacity electrode layer, liquid crystal orientation is not disturbed by potential occurring between the pixel electrode and the capacity electrode layer.

In the electro-optical device, the pillar-shaped protrusion may be provided in a position that overlaps the capacity electrode layer when viewed from above. In this configuration, since the pillar-shaped protrusion and the conduction section are provided at a high level, a film-thick portion of the capacity electrode layer may be electrically connected to the pixel electrode, in an easy manner.

The electro-optical device for use in a liquid crystal device, may have a configuration that holds a liquid crystal layer between the substrate and an opposite substrate opposite to the substrate.

The electro-optical device to which an aspect of the invention is applied may be used in a variety of display devices for a variety of electronic devices, such as a direct-view display device. Furthermore, the electro-optical device to which the aspect of the invention is applied may be used in a projection-type display device. This projection-type display device includes a light source unit emitting light to be incident on the electro-optical device, and a projection optical system projecting light modulated by the electro-optical device.

BRIEF DESCRIPTION OF THE DRAWINGS

The invention will be described with reference to the accompanying drawings, wherein like numbers reference like elements;

FIGS. 3A and 3B are explanatory views of pixels of the electro-optical device to which the aspect of the invention is applied.

FIGS. 4A to 4F are explanatory views of the essential steps of a manufacturing process of the electro-optical device to which the aspect of the invention is applied.

DESCRIPTION OF EXEMPLARY EMBODIMENTS

The embodiments are now described with reference to the accompanying drawings. Among a variety of electro-optical devices, the liquid crystal device and a method of manufacturing the liquid crystal device are described, focusing on the case where the aspect of the invention is applied in connecting electrically a pixel electrode 9a and a second electrode layer 7a (a conductive layer). Furthermore, layers and members are enlarged to recognizable degrees in each of the figures, and thus vary in scale from figure to figure. Furthermore, the roles of a source and a drain are in practice interchanged when a direction of electrical current flowing through a pixel transistor is reversed. However, one side (a source drain area in the direction of the pixel), to which the pixel electrode is electrically connected, is defined as a drain, and the other side (a source drain area in the direction of the data line), to which a data line is electrically connected, is defined as a source. Furthermore, when describing a layer formed on an element substrate, the term 'the upward direction' or 'the surface direction' is used to mean the direction opposite to the direction in which the substrate body of the element substrate is positioned (the direction of the opposite substrate), and the term 'the downward direction' is used to mean the direction in which the substrate body of the element substrate is positioned (the direction opposite to the direction in which the opposite substrate is positioned).

Description of Electro-Optical Device (Liquid Crystal Device)

Whole Configuration

Figure 1:
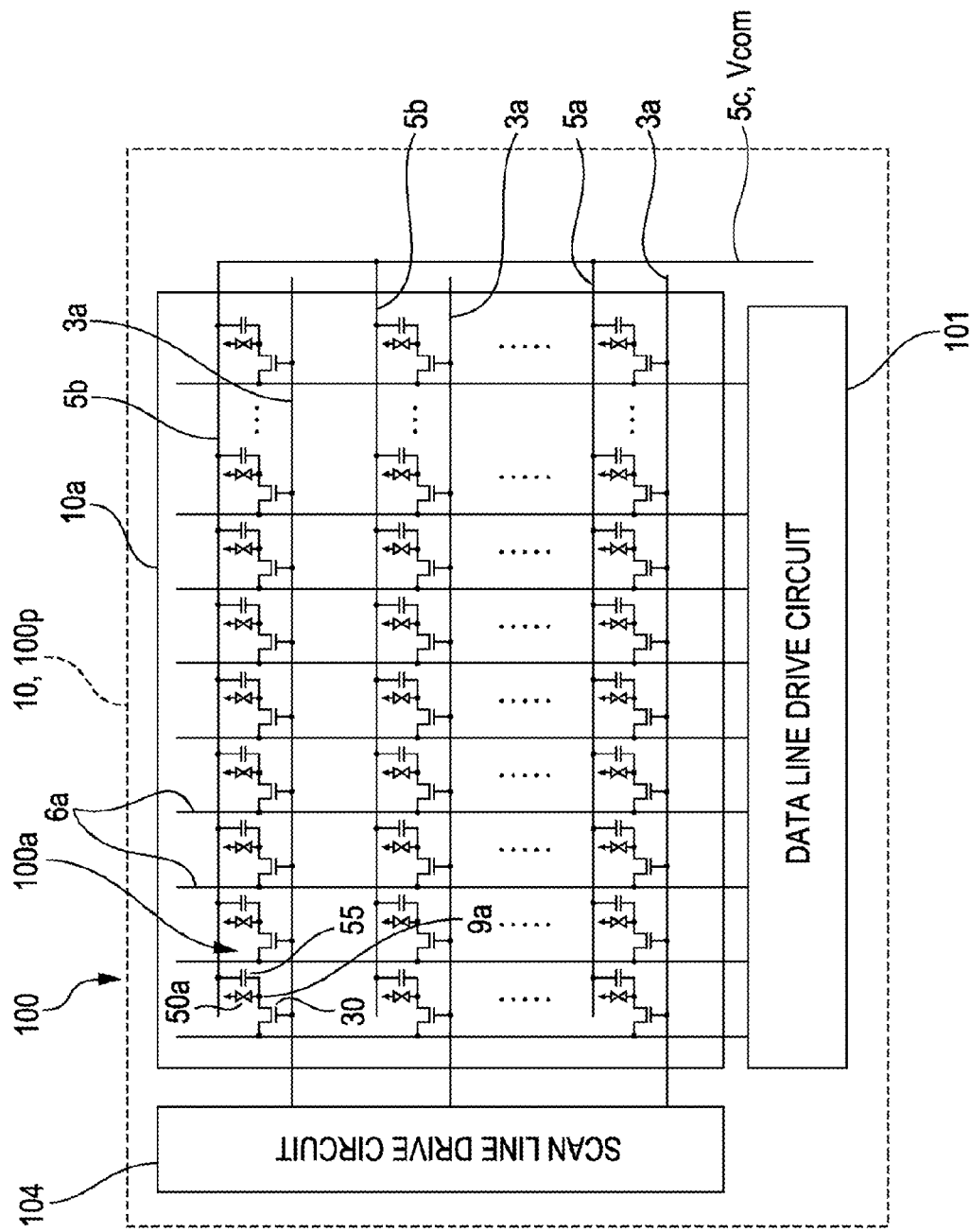
FIG. 1 is a block diagram illustrating an electrical configuration of an electro-optical device to which an aspect of the invention is applied.

FIG. 1 is a block diagram illustrating an electrical configuration of the electro-optical device to which an aspect of the invention is applied. FIG. 1 is only an electrical block diagram and therefore schematically shows a layout, such as a direction in which a capacity electrode layer extends.

As shown in FIG. 1, the electro-optical device 100 (a liquid crystal device) according to the invention includes a liquid crystal panel 100p of a TN (Twisted Nematic) mode and a VA (Vertical Alignment) mode. The liquid crystal panel 100p has an image display area 10a (a pixel area) in the middle, where a plurality of pixels 100a are arranged in the matrix. In the liquid crystal panel 100p, a plurality of data lines 6a and a plurality of scan lines 3a extend in rows and columns within the image display area 10a on the element substrate 10 (refer to FIGS. 2A and 2B), which is described below, and the pixels 100a are formed in a position corresponding to an intersection where the data line 6a and the scan line 3a cross each other. A pixel transistor 30, made from an effect type transistor and a pixel electrode 9a to be described below, is formed on each of the plurality of the pixels 100a. The data line 6a is electrically connected to a source of the pixel transistor 30. The scan line 3a is electrically connected to a gate of the pixel transistor 30. The pixel electrode 9a is electrically connected to a drain of the pixel transistor 30.

A scan line drive circuit 104 and a data line drive circuit 101 are provided outside of the image display area 10a on the element substrate 10. The data line drive circuit 101 is electrically connected to each of data lines 6a and sends an image signal, received from an image process circuit, sequentially to each of the data lines 6a. The scan line drive circuit 104 is electrically connected to each of scan lines 3*a* and sequentially sends a scan signal to each of the scan lines 3*a*.

The pixel electrode 9*a* in each pixel 100*a* is opposite to a common electrode formed on the opposite substrate 20 (refer to FIGS. 2A and 2B) to be described below, through a liquid crystal layer, and makes up the liquid crystal capacitance 50*a*. Furthermore, a storage capacitance 55 is added to each pixel 100*a*, in parallel with the liquid crystal capacitance 50*a*, to prevent a change in an image signal retained in the liquid crystal capacitance 50*a*. In the embodiment, a first electrode layer 5*a* straddling the plurality of pixels 100*a* is formed as an electrode capacity layer to make up the storage capacitance 55. In the embodiment, the first electrode layer 5*a* is electrically connected to a common potential line 5*c* to which common potential Vcom is applied.

Configuration of Liquid Crystal Panel 100*p*

Figure 2A:
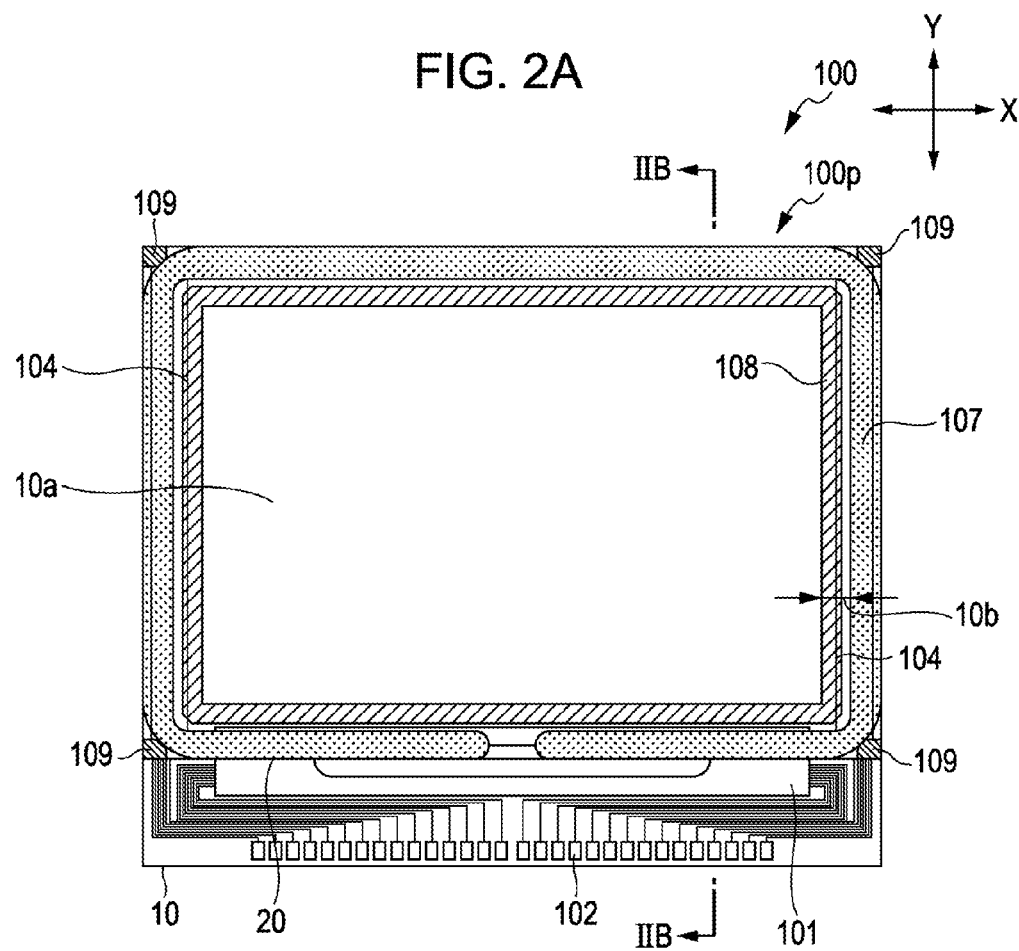
FIGS. 2A and 2B are explanatory views of a liquid crystal panel used in the electro-optical device to which the aspect of the invention is applied.
Figure 2B:
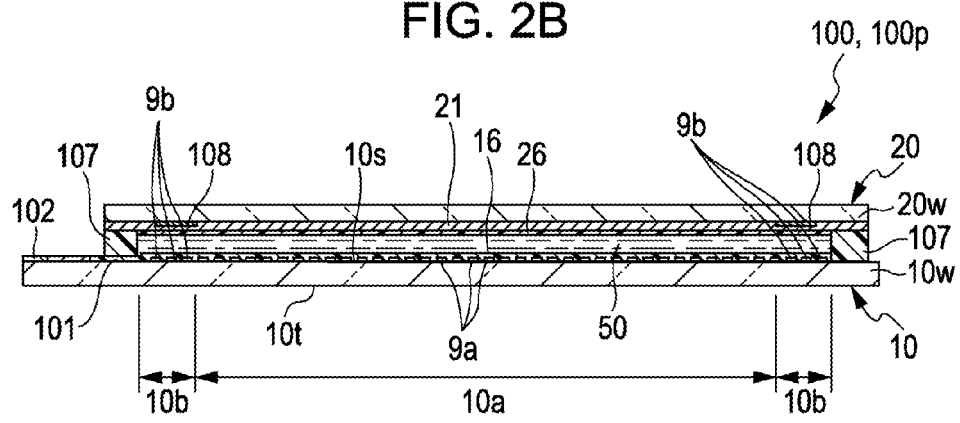

FIGS. 2A and 2B are explanatory views of the liquid crystal panel 100*p* for use in the electro-optical device 100 to which the aspect of the invention is applied. FIG. 2A is a top view of the liquid crystal panel 100*p* and elements of the liquid crystal panel 100*p*, when viewed from the opposite substrate. FIG. 2B is a cross sectional view of the liquid crystal panel 100*p* and the elements of the liquid crystal panel 100*p* cut along line IIB-IIB.

As shown in FIGS. 2A and 2B, the liquid crystal panel 100*p* is made by attaching an element substrate 10 (an element substrate for use in the electro-optical device) and the opposite substrate 20 to each other, with a given distance in between, by using a sealant 107 provided in a frame shape along the edge of the opposite substrate 20. The sealant 107 is an adhesive made of a material such as a photopolymer or a thermosetting resin. The sealant 107 is mixed with a gap-maintaining material, such as a glass fiber or a glass bead to maintain the given distance between the two substrates.

In this configuration, in the liquid crystal panel 100*p*, the element substrate 10 and the opposite substrate 20 are all in the rectangular form, and thus the image display area 10*a*, as described referring to FIG. 1, is provided in the rectangular form in the near middle of the liquid crystal panel 100*p*. Accordingly, the sealant 107 is provided in the near rectangular form, and a periphery area 10*b* in the near rectangular form is provided in the picture frame between an inner peripheral line of the sealant 107 and an outer peripheral line of the image display area 10*a*. In the element substrate 10, a data line drive circuit 101 and a plurality of terminals 102 are formed along one outside part of the element substrate 10, but outside of the image display area 10*a*, and a scan line drive circuit 104 is formed along the other outside part adjacent to the one outside part. A flexible wiring substrate (not shown) is connected to the terminal 102. A variety of potential and a variety of signals are input to the element substrate 10 through the flexible wiring substrate.

The pixel transistor 30, described referring to FIG. 1, and the pixel electrode 9*a*, electrically connected to the pixel transistor 30, are formed in the matrix on the image display area 10*a*, on one side 10*s* of the one side 10*s* and other side 10*t* of the element substrate 10, and an oriented film 16 is formed on the pixel electrode 9*a*, in the upward direction. This is described below in more detail.

Furthermore, a dummy pixel electrode 9*b* (refer to FIG. 2B), which was formed at the same time as the pixel electrode 9*a*, is formed in a peripheral area 10*b* on one side 10*s* of the element substrate 10. The dummy pixel electrode 9*b* may be electrically connected to a dummy pixel transistor, or direct to wiring without the dummy pixel transistor being provided. Otherwise, the dummy pixel electrode 9*b* may be in a floating state. In the floating state, potential is not applied to the dummy pixel electrode 9*b*. This dummy pixel electrode 9*b* contributes to reducing height positions of both of the image display area 10*a* and the peripheral area 10*b* to the same level and to smoothing the surface on which to form an oriented film 16, when smoothing the surface on which to form the oriented film 16 on the element substrate 10. Furthermore, disturbance of the orientation of liquid crystal molecules may be prevented in the peripheral end of the image display area 10*a*, when the dummy pixel electrode 9*b* is set to given potential.

A common electrode 21 is formed on one side of the opposite substrate 20, that is, on the one side opposite to the element substrate 10. An oriented film 26 is formed on the common electrode 21. The common electrode 21 is formed in such a manner as to straddle almost the entire surface of the opposite substrate 20, or the plurality of the pixels 100*a* as a plurality of strip electrodes. Furthermore, a light-shielding layer 108 is formed beneath the common electrode 21, in the downward direction (that is, in the direction of opposing the element substrate 10), on one side of the opposite substrate 20. In the embodiment, the light-shielding layer 108 is formed on the picture frame extending along the outer peripheral line of the image display area 10*a*, and has a function of forming a border. At this point, the outer peripheral line of the light-shielding layer 108 is located a given distance away from the inner peripheral line of the sealant 107, and thus the light-shielding layer 108 and the sealant 107 do not overlap each other. The light-shielding layer 108 may be formed as a black matrix part in, for example, an area overlapping an inter-pixel area interposed between the adjacent pixel electrodes 9*a*, on the opposite substrate 20.

In this configuration of the liquid crystal panel 100*p*, an inter-substrate conduction electrode 109 for electrical conduction between the element substrate 10 and the opposite substrate 20, is formed in an area overlapping a corner part of the opposite substrate 20, outside of the sealant 107, on the element substrate 10. The inter-substrate conduction material 109*a*, including conductive particles, is provided on this inter-substrate conduction electrode 109, and the common electrode 21 of the opposite substrate 20 is electrically connected to the element substrate 10, through the inter-substrate conduction material 109*a* and the inter-substrate conduction electrode 109. For this reason, common potential Vcom, provided from the element substrate 10, is applied to the common electrode 21. The sealant 107 is provided along the outer peripheral line of the opposite substrate 20, in such a manner as to keep the sealant 107 in almost the same width. For this reason, the sealant 107 is in the near rectangular form. However, the sealant 107 is provided in such a manner as to pass inward to avoid the inter-substrate conduction electrode 109 in the area overlapping the corner part of the opposite substrate 20, and the corner part of the sealant 107 is in the form of an arc.

In this configuration, the electro-optical device 100 may make up a transmission-type liquid crystal device, when the pixel electrode 9*a* and the common electrode 21 are formed using a translucent conducting layer such as an ITO (Indium Tin Oxide) layer and an IZO (Indium Zinc Oxide) layer. In contrast, the electro-optical device 100 may make up a reflection-type liquid crystal device, when the common electrode 21 is formed using the translucent conducting layer such as the ITO layer and the IZO layer, and the pixel electrode 9*a* is formed using a reflective conducting layer such as an aluminum layer. In the case where the electro-optical device 100 is a reflection type, incident light from the opposite substrate 20 is modulated to display an image while it reflects off the element substrate 10 and is emitted. In the case where the electro-optical device 100 is a transmission type, incident light from one of the element substrate 10 and the opposite substrate 20 is modulated to display an image while the incident light penetrates the other and is emitted.

The electro-optical device 100 may serve as a color display device for an electronic device such as a mobile computer, or a portable telephone. In this case, a color filter (not shown) and a protective film are formed on the opposite substrate 20. Furthermore, in the electro-optical device 100, a phase difference film, a polarizing plate and others are provided in a given direction with respect to the liquid crystal panel 100p, separately depending on a kind of a liquid crystal layer 50 in use, a normal white mode and a normal black mode. In addition, the electro-optical device 100 may serve as a light valve for RGB in a projection-type display device (a liquid crystal projector), which is described below. In this case, a color filter isn't formed, because each light of the colors, which were separated through a dichroic mirror for RGB color separation, is made to be incident on each of the electro-optical devices 100 for RGB, as the incident light.

In this embodiment, the electro-optical device 100 is described, focusing on the case where the electro-optical device 100 is a transmission-type liquid crystal device that is served as the light valve for RGB, in the projection-type display device to be described below, and incident light from the opposite substrate 20 penetrates the element substrate 10 and is emitted. Furthermore, in the embodiment, the electro-optical device 100 is described, focusing on a case where the electro-optical device 100 includes a liquid crystal panel 100p of VA mode that uses nematic liquid crystal compound with negative dielectric anisotropy, as a liquid crystal layer 50.

Specific Configuration of Pixel

FIGS. 3A and 3B are explanatory views of the pixels of the electro-optical device 100 to which the aspect of the invention is applied. FIG. 3A is a top view of the adjacent pixels in the element substrate 10. FIG. 3B is a cross sectional view of the electro-optical device 100 cut in a position corresponding to line IIIB-IIIB in FIG. 3A. In FIG. 3A, the following areas are indicated by the corresponding lines.

A scan line 3a is indicated by a thick solid line. A semiconductor layer 1a is indicated by a thin short dotted line. The data line 6a and a drain electrode 6b are indicated by an alternate long and short dash line. The first electrode layer 5a and a relay electrode 5b are indicated by a long thin dotted line. The second electrode layer 7a is indicated by a chain double-dashed line. The pixel electrode 9a is indicated by a thick short dotted line.

As shown in FIG. 3A, a pixel electrode 9a, rectangular in shape, is formed on each of the pixels 100a, and data lines 6a and scan lines 3a are formed along an area overlapping an inter-pixel area 10f interposed between the adjacent pixel electrodes 9a, in the element substrate 10. More specifically, the scan line 3a extends along an area overlapping a first inter-pixel area 10g extending in the first direction (in the X direction), and the data line 6a extends along an area overlapping a second inter-pixel area 10h extending in the second direction (in the Y direction), on an inter-pixel area 10f. Each of the data line 6a and the scan line 3a extends in the straight line, and the pixel transistor 30 is formed in an area where the data line 6a and the scan line 3a intersect. As described referring to FIG. 1, the first electrode layer 5a (a capacity electrode layer) is formed on the element substrate 10, in such a manner that the first electrode layer 5a overlaps the data line 6a.

As shown in FIGS. 3A and 3B, the element substrate 10 includes a substrate body 10w of translucency, such as a quartz substrate and a glass substrate, a pixel electrode 9a formed in the direction of the liquid crystal layer 50 over the substrate body 10w of (upward from one side 10S of the substrate body 10w), pixel transistor 30 for pixel switching, and an oriented film 16, as main components. The opposite substrate 20 includes a substrate body 20w of translucency, such as a quartz substrate and a glass substrate, the common electrode 21, formed on a surface of the substrate body 20w in the direction of a liquid crystal layer 50 (on the one side opposite to the element substrate 10), and an oriented film 26, as main elements.

The scan line 3a is formed on one side of the substrate body 10w, from a conducting layer such as a conductive polysilicon film, a metal silicide film, a metal film, or metal film chemical compound, on the element substrate 10. In the embodiment, the scan line 3a may include a light shielding conductive film such as tungsten silicide ($WSi_x$), and functions as a light shielding film for a pixel transistor 30. In the embodiment, the scan line 3a is made from tungsten silicide, approximately 200 nm in thickness. An insulating film, such as a silicon oxide film, may be provided between the substrate body 10w and the scan line 3a.

An insulating film 12, such as a silicon oxide film, is formed on the scan line 3a, in the upward direction, and the pixel transistor 30 having the semiconductor layer 1a is formed on the surface of the insulating layer 12, on the one side 10s of the substrate body 10w. In the embodiment, the insulating layer 12 has, for example, a two-layer structure which is composed of a silicon oxide film formed by a low pressure CVD method of using tetraethoxysilane($Si(OC_2H_5)_4$), or by a plasma CVD method of using tetraethoxysilane and oxygen gas, and a silicon oxide film (a HTO (High Temperature Oxide) film) formed by a high temperature CVD method.

The pixel transistor 30 includes the semiconductor layer 1a and a gate electrode 3c. The semiconductor layer 1a faces the long side direction in the extension direction of the scan line 3a in an intersection area where the scan line 3a and the data line 6a intersect. The gate electrode 3c extends in the direction perpendicular to the lengthwise direction of the semiconductor layer 1a, and overlaps the middle part of the semiconductor layer 1a in the lengthwise direction. Furthermore, the pixel transistor 30 includes a gate insulating layer 2 of translucency between the semiconductor layer 1a and the gate electrode 3c. The semiconductor layer 1a includes a channel area 1g facing a gate electrode 3c through the gate insulating layer 2, and includes a source area 1b and a drain area 1c next to both sides of the channel area 1g, respectively. In the embodiment, the pixel transistor 30 has an LDD structure. Therefore, the source area 1b and drain area 1c have low concentration areas 1b1 and 1c1, with the channel area 1g in between, respectively, and have high concentration areas 1b2 and 1c2, next to the low concentration area 1b1 and 1c1, respectively. The concentration area 1b1 and 1c1 are positioned between the channel area 1g and the high concentration 1b2 and between the channel area 1g and the high concentration 1c2.

The semiconductor layer 1a includes, for example, a polycrystalline silicon film. The gate insulating layer 2 has a two-layer structure. This two-layer structure consists of a first gate insulating layer 2a, which is a silicon oxide film formed by thermal oxidation of the semiconductor layer 1a, and a second gate insulating layer 2b, which is a silicon oxide film formed by, for example, the CVD method. The gate electrode 3c is formed from a polysilicon film of conductivity, a metal silicide film, a metal film, or a conductive layer such as a metal film chemical compound. With the semiconductor layer 1a in between, the gate electrode 3c is electrically connected to the scan line 3a, through contact holes 12a and 12b passing through the second gate insulating layer 2b and the insulating layer 12. In the embodiment, the gate electrode 3c has a two-layer structure, which consists of a conductive polysilicon film, approximately 100 nm in thickness and a tungsten silicide film, approximately 100 nm in thickness.

In the embodiment, light reflecting off the other components after penetrating the electro-optical device 100 is incident on the semiconductor layer 1a, and thus malfunction due to photoelectric current takes place in the pixel transistor 30. In the embodiment, the scan line 3a is formed like a light shielding film, in order to prevent this. However, the scanning line may be formed on the gate insulating layer 2, and one portion of the scanning line may serve as the gate electrode 3c. In this case, the scan line 3a, as shown in FIGS. 3A and 3B, is formed for the purpose of light shielding only.

An inter-layer insulating film 41 of translucency, which is made from, for example, a silicon oxide film, is formed on the gate electrode 3c, in the upward direction, and a data line 6a and a drain electrode 6b are formed on an inter-layer insulating film 41, from the same kind of insulating film. The inter-layer insulating film 41, for example, is made from a silicon oxide film formed by a plasma CVD method of using silane gas (SH$_4$) and nitrous oxide (N$_2$O).

The data line 6a and the drain electrode 6b are made from a conductive layer, such as a conductive polysilicon film, a metal silicide film, a metal film, or a metal film chemical compound. In the embodiment, the data line 6a and the drain electrode 6b have a four-layer structure, which is built by depositing a titanium (Ti) film, 20 nm in thickness, titanium nitride (TiN) film, 50 nm in thickness, aluminum (Al) film, 350 nm in thickness, and TiN film, 150 nm in thickness, in this order. The data line 6a is electrically connected to a source area 1b (a source drain area to the side of the data line) through a contact hole 41a passing through an inter-layer insulating film 41 and a second gate insulating layer 2b. The drain electrode 6b is formed in such a manner as to partly overlap the drain area 1c of the semiconductor layer 1a (a source drain area to the side of the pixel electrode) in an area overlapping the first inter-pixel area 10g, and is electrically connected to the drain area 1c through a contact hole 41b passing through the inter-layer insulating film 41 and the second gate insulating layer 2b.

An inter-layer insulating film 42 of translucency, which is made from, for example, the silicon oxide film, is formed on the data line 6a and the drain electrode 6b, in the upward direction. The inter-layer insulating film 42, for example, is made from the silicon oxide film formed by, for example, a plasma CVD method of using tetraethoxysilane and oxygen gas.

The first electrode layer 5a and the relay electrode 5b are formed on the inter-layer insulating film 42 in the upward direction, from the same kind of insulating film. The first electrode layer 5a and the relay electrode 5b are made from a conductive polysilicon film, a metal silicide film, a metal film, a metal film chemical compound, or others. In the embodiment, the first electrode layer 5a and the relay electrode 5b have a two-layer structure, which consists of an Al film, approximately 350 nm in thickness and a TiN film, approximately 150 nm in thickness. Like the data line 6a, the first electrode layer 5a extends along an area overlapping the second inter-pixel area 10h. The relay electrode 5b is formed in such a manner as to partly overlap a drain electrode 6b in an area overlapping the first inter-pixel area 10g, and is electrically connected to a drain electrode 6b through a contact hole 42a passing through the inter-layer insulating film 42.

An insulating film 44 of translucency (a first insulating film) is formed as an etching stopper layer on the first electrode layer 5a and the relay electrode 5b, in the upward direction, and an opening 44b is formed in an area overlapping the first electrode layer 5a on the insulating film 44. In the embodiment, the insulating film 44 is made from, for example, the silicon oxide film formed by, for example, a plasma CVD method of tetraethoxysilane and oxygen gas. At this point, the opening 44b, not shown in FIG. 3A, is L-shaped, in such a manner as to have a portion extending along an area overlapping the first inter-pixel area 10g, starting from an intersection area where the data line 6a and the scan line 3a intersect, and a portion extending along an area overlapping the second inter-pixel area 10h, starting from an intersection area where the data line 6a and the scan line 3a intersect.

A dielectric layer 40 of translucency is formed on the insulating film 44, in the upward direction, and the second electrode layer 7a is formed on the dielectric layer 40, in the upward direction. The second electrode layer 7a is made from a conductive polysilicon film, a metal silicide film, a metal film, a metal film chemical compound, or others. In the embodiment, the second electrode layer 7a is made from a TiN film, approximately 300 nm in thickness. Silicon compound, such as a silicon oxide film and a silicon nitride film, may serve as the dielectric layer 40. In addition, a dielectric layer of high conductivity, such as an aluminum oxide film, a titanium oxide film, a tantanlum oxide film, a niobium oxide film, a hafnium oxide film, a lanthanum oxide film, and a zirconium oxide film, may serve as the dielectric layer 40. The second electrode layer 7a is L-shaped, in such a manner as to have a portion extending along an area overlapping the first inter-pixel area 10g, starting from an intersection area where the data line 6a and the scan line 3a intersect, and a portion extending along an area overlapping the second inter-pixel area 10h, starting from the intersection area where the data line 6a and the scan line 3a intersect. Therefore, in the region of the second electrode layer 7a, a portion extending along the area overlapping the second inter-pixel area 10h overlaps the first electrode layer 5a, with the dielectric layer 40 in between, around the opening 44b in the insulating film 44. In the embodiment, the first electrode layer 5a, the dielectric layer 40, and the second electrode layer 7a make up the storage capacitance 55 in an area overlapping the first inter-pixel area 10g, in this manner.

Furthermore, in the region of the second electrode layer 7a, a portion extending along an area overlapping the first inter-pixel area 10g partly overlaps the relay electrode 5b, and is electrically connected to the relay electrode 5b through a contact hole 44a passing through the dielectric layer 40 and the insulating film 44.

An inter-layer insulating film 45 of translucency is formed on the second electrode layer 7a, in the upward direction, and the pixel electrode 9a, made from a conductive layer of translucency such as an ITO film approximately 20 nm in thickness, is formed on the inter-layer insulating film 45, in the upward direction. The inter-layer insulating film 45, for example, is made from a silicon oxide film formed by, for example, a plasma CVD method of using tetraethoxysilane and oxygen gas. The pixel electrode 9a partly overlaps the second electrode layer 7a near an intersection area where the data line 6a and scan line 3a intersect, and pixel electrode 9a and is electrically connected to the pixel electrode 9a and the second electrode layer 7a, in a contact portion 9t, which is described below.

The oriented film 16 is formed on the surface of the pixel electrode 9a. The oriented film 16 is made from a polymeric film such as polyimide, or from an oblique deposition film such as a silicon oxide film. In the embodiment, the oriented film 16 is an inorganic oriented film (a vertical oriented film), made from an oblique deposition film, such as $SiO_x$ (x<2), $SiO_2$, $TiO_2$, MgO, $Al_2O_3$, $In_2O_3$, $Sb_2O_3$, $Ta_2O_5$, or others.

In the opposite substrate 20, the common electrode 21, made from a conductive film of translucency such as ITO film, is, in the direction of the liquid crystal layer 50 (in the direction of facing the element substrate 10), formed on the surface of a substrate body 20w of translucency, such as a quartz substrate and a glass substrate, and the oriented film 26 is formed in such a manner as to cover this common electrode 21. Like the oriented film 16, the oriented film 26 is made from a polymeric film such as polyimide, or from an oblique deposition film such as a silicon oxide film. In the embodiment, the oriented film 26 is an inorganic oriented film (a vertical oriented film) made from the oblique deposition film, such as $SiO_x$(x<2), $SiO_2$, $TiO_2$, MgO, $Al_2O_3$, $In_2O_3$, $Sb_2O_3$, $Ta_2O_5$, or others. These oriented films 16 and 26 cause the vertical orientation of nematic liquid crystal compound with negative dielectric anisotropy in the liquid crystal layer 50, so that the liquid crystal panel 100p operates in the VA mode of normal black.

A complementary transistor circuit, having a re-channel type transistor for driving and a p-channel type transistor for driving, is included in the data line drive circuit 101 and the scan line drive circuit 104, above described referring to FIGS. 1 to 2B. At this point, the transistor for driving may be formed by using process steps of manufacturing the pixel transistor 30. For this reason, an area where the data line drive circuit 101 and the scan line drive circuit 104 are formed, has the almost same configuration as the cross sectional area shown in FIG. 3B, in the element substrate 10.

Peripheral Configuration of Pixel Electrode 9a

In the embodiment, a pillar-shaped protrusion 440, protruding toward a pixel electrode 9a, is first formed in a position overlapping the pixel electrode 9a in the insulating film 44 (the first insulating film), in forming a contact portion 9t connecting electrically between the pixel electrode 9a and the second electrode layer 7a, in the electro-optical device 100. Furthermore, the second electrode layer 7a (conductive layer) is formed in an area overlapping the pillar-shaped protrusion 440 in the second electrode layer 7a. A portion overlapping the pillar-shaped protrusion 440 when viewed from above becomes a conduction section 7t connecting electrically to the pixel electrode 9a. The inter-layer insulating film 45 (the second insulating film) is formed on the second electrode layer 7a, and a surface 7s of a conduction section 7t is exposed on a surface 450 of the inter-layer insulating film 45. Therefore, a pixel electrode 9a formed on the surface 450 of the inter-layer insulating film 45 gets in contact with the surface 7s of the conduction section 7t, and thus is electrically connected to the second electrode layer 7a.

At this point, the surface 450 of the inter-layer insulating film 45 becomes plane, and thus the surface 450 of the inter-layer insulating film 45 and the surface 7s of the conduction section 7t in succession makes up one plane. For this reason, the pixel electrode 9a is formed on a plane surface, and thus the surface of the pixel electrode 9a is plane. Therefore, the oriented film 16 is formed on a plane surface, next to the surface of the pixel electrode 9a.

In the embodiment, the pillar-shaped protrusion 440 is formed at a position overlapping the first electrode layer 5a and the data line 6a, when viewed from above. For this reason, the pillar-shaped protrusion 440 is positioned over a film-thick portion of the first electrode layer 5a and the film-thick portion of the data line 6a.

In the embodiment, the first electrode layer 5a, to which common potential Vcom is applied, and the second electrode layer 7a, to which the potential Vsig is applied, are formed in an area overlapping an area (the second inter-pixel area 10h) between the pixel electrodes 9a adjacent in the first direction (in the X direction), but the second electrode layer 7a is positioned over the first electrode layer 5a (to the side of the pixel electrode 9a), in the upward direction. At this point, the potential Vsig applied to the second electrode layer 7a is the same as that applied to the pixel electrode 9a. The scan line 3a, to which the scan signal is applied, and the second electrode layer 7a, to which the potential Vsig is applied, are formed in an area overlapping an area (the first inter-pixel area 10g) between the pixel electrodes 9a adjacent in the second direction (in the Y direction), but the second electrode layer 7a is positioned over the scan line 3a (to the side of the pixel electrode 9a) in the upward direction. At this point, the potential Vsig applied to the second electrode layer 7a is the same as that applied to the pixel electrode 9a.

Manufacturing Method of the Electro-Optical Device 100

FIGS. 4A to 5E are explanatory views of showing the essential steps of a manufacturing process of the electro-optical device 100 to which the aspect of the invention is applied. The steps are actually performed on a large-sized substrate which is to be divided into a plurality of element substrates 10 in the subsequent step, but is below described in terms of the element substrate 10 regardless of the size of the substrate. Furthermore, the proceeding steps of forming the first electrode layer 5a are well known in the art and therefore are not described below.

In the manufacturing process of the electro-optical device 100 according to the embodiment, in the step of forming the element substrate 10, the insulating film 44 (the first insulating film) is formed from a silicon oxide film, approximately 600 nm in thickness by, for example, a plasma CVD method of tetraethoxysilane and oxygen gas, in the step of forming the first insulating film, after the first electrode layer 5a and the relay electrode 5b are formed by a well-known method as shown in FIG. 4A. The first electrode layer 5a has a two-layer structure, which consists of an Al film, approximately 350 nm in thickness and a Tin film, approximately 150 nm in thickness.

Next, a mask 44r is formed in a position overlapping an area where the pixel electrode 9a needs to be formed, and, under this condition, the surface of the insulating film 44 is etched, in the insulating film 44 in a step of forming the pillar-shaped protrusion as shown in FIG. 4B. As a result, the pillar-shaped protrusion 440, protruding upward, is formed on the insulating film 44. This etching may be performed by a RIE (reactive ion etching) method of using fluorine-series gas such as $CF_4$ (tetrafluoromethane) and $CHF_3$ (methane trifluoride), and therefore is high in etching anisotropy. In addition, the etching ensures easy control of an amount of etching. Therefore, the pillar-shaped protrusion 440 may be formed on the insulating film 44, in an easy manner and without any failure.

Next, in a step of forming an opening, as shown in FIG. 4C, a mask 44s, for making an opening in an area where the opening 44b needs to be formed, is formed on the surface of the insulating film 44, and, under this condition, the opening 44b is formed by etching the insulating film 44.

Next, as shown in FIG. 4D, a dielectric layer 40 is formed on the insulating film 44, in the upward direction, in a step of forming a dielectric layer.

Next, in a step of forming a contact hole, as shown in FIG. 4E, a mask 44t, for making an opening in an area where a contact hole 44a needs to be formed, is formed on the surface of the dielectric layer 40, and, under this condition, the contact hole 44a is formed in a position overlapping the relay electrode 5b by etching the dielectric layer 40 and the insulating film 44.

Figure 5A:
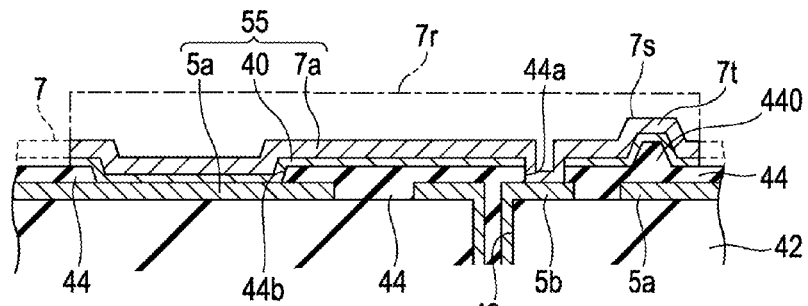
FIGS. 5A to 5E are explanatory views of the essential steps of the manufacturing process of the electro-optical device to which the aspect of the invention is applied.

Next, as shown in FIG. 5A, a mask 7r is formed in an area where the second electrode layer 7a needs to be formed, and, under this condition, the second electrode layer 7a is formed by etching the dielectric layer 40 and the conductive layer 7, after a conductive layer 7 was formed on the surface of the dielectric layer 40 in a step of forming a conductive layer, as shown in FIG. 4F. At this point, a portion overlapping the highest surface of the pillar-shaped protrusion 440 in the second electrode layer 7a becomes a conduction section 7t, when this step is performed, the insulating film 44 exists as an etching stopper layer, in a position overlapping the highest portion of the second electrode layer 7a. For this reason, short circuit between the first electrode layer 5a and the second electrode layer 7a may be prevented by the insulating film 44, although the dielectric layer 40 is thin. In the embodiment, the second electrode layer 7a, is made from, for example, a TiN film, approximately 300 nm in thickness.

Figure 5B:
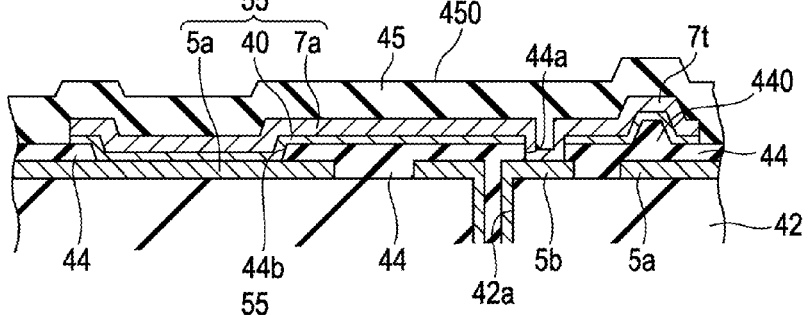

Next, in a step of forming a second insulating film, as shown in FIG. 5B, the inter-layer insulating film 45 (the second insulating film) is formed from a silicon oxide film, approximately 2000 nm in thickness, by a plasma CVD method of using tetraethoxysilane and oxygen gas.

Figure 5C:
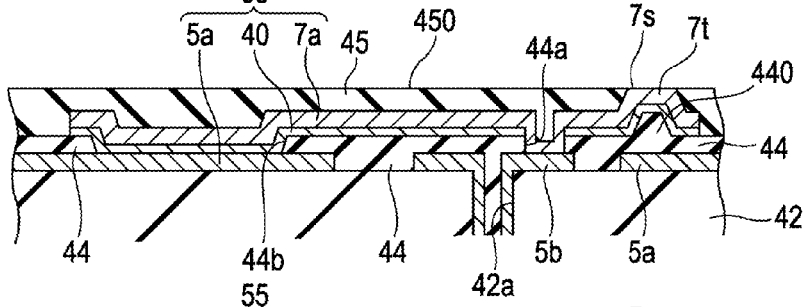

Next, in a step of exposing a conduction section, as shown in FIG. 5C, the surface 7s of the conduction section 7t of the second electrode layer 7a is exposed by removing the inter-layer insulating film 45 from the surface 450. In this step of exposing the conduction section, for example, a surface of the inter-layer insulating film 45 is polished. In this polishing step, chemical mechanical polishing may be performed, and thus, a smooth polished surface may be accomplished at high speed by action of chemical composition contained polishing liquid and by the relative movement between a polishing agent and the element substrate 10. More specifically, polishing apparatus performs polishing by producing the relative movement between a surface plate to which a polishing cloth (a pad) is attached, and a holder holding the element substrate 10. The polishing cloth may be made from non-woven fabric, foamed polyurethane, porous fluorocarbon resin, and other materials. At this point, for example, a polishing agent is provided between the polishing cloth and the element substrate 10. The polishing agent includes a cerium oxide particle with an average diameter of 0.01 μm to 20 μm, acrylic acid ester derivative as a dispersing agent, and water. As a result, the surface 450 of the inter-layer insulating film 45 becomes plane, and is at the same level as the surface 7s of the conduction section 7t.

Furthermore, a so-called etch back method may be alternatively used in removing the inter-layer insulating film 45 from the surface 450 in the downward direction to expose the surface 7s of the conduction section 7t of the second electrode layer 7a. In this etch back method, dry etching is performed on a resin layer and the inter-layer insulating film 45 at the same speed, until the surface 7s of the conduction section 7t is exposed, after forming the resin layer on the surface of the inter-layer insulating film 45.

Figure 5D:
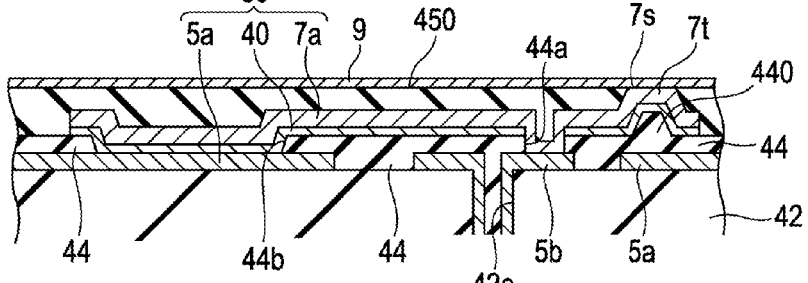
Figure 5E:
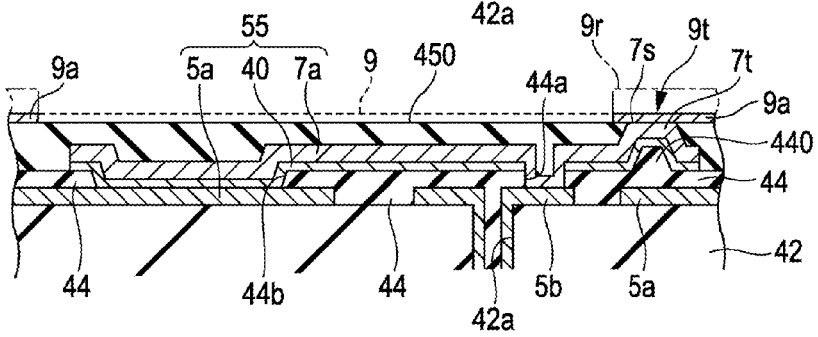

Next, in a step of forming a pixel electrode, a mask 9r, as shown in FIG. 5E, is formed in an area where a pixel electrode 9a needs to be formed, and, under this condition, the pixel electrode 9a is formed by etching a conductive film 9 for the pixel electrode, after forming the conductive film 9 for the pixel electrode, such as an ITO film, approximately 20 nm in thickness, on the surface of the inter-layer insulating film 45, by using, for example, the sputtering method, as shown in FIG. 5D. As a result, the pixel electrode 9a comes in contact with the surface 7s of the conduction section 7t of the second electrode layer 7a, and thus is electrically connected to the second electrode layer 7a.

Thereafter, an oriented film 16 is formed as shown in FIGS. 3A and 3B. Subsequent steps are performed by using well-known methods and therefore are not described.

Main Effects of the Embodiment

As is above described, in the electro-optical device 100 and the manufacturing method of the electro-optical device 100 according to the embodiment, the pillar-shaped protrusion 440, protruding at the position overlapping the pixel electrode 9a toward the pixel electrode 9a, is formed on the insulating film 44 (the first insulating film) provided below the pixel electrode 9a (between the pixel electrode 9a and the substrate body 10w), in the downward direction, and thus the conduction section 7t of the second electrode layer 7a (the conductive layer) overlaps the highest surface of this pillar-shaped protrusion 440. Furthermore, the inter-layer insulating film 45 (the second insulating film) is provided between the second electrode layer 7a and the pixel electrode 9a, but the conduction section 7t is exposed on the surface 450 of the inter-layer insulating film 45. For this reason, the pixel electrode 9a is electrically connected to the conduction section 7t, when the pixel electrode 9a is deposited on the inter-layer insulating film 45. For this reason, the contact portion is smaller in horizontal size, the pixel electrode does 9a does not have a large depression and elevation on the surface, compared to the structure that connects the pixel electrode and the conductive layer by using the contact hole formed in the insulating film. Furthermore, conduction of the pixel electrode 9a may be done by using the film formed in the electro-optical device 100 for other purposes, such as the second electrode layer 7a, the insulating film (the insulating film 44 and the inter-layer insulating film 45), and others. That is, conduction of the pixel electrode 9a may be done by using the insulating film 44 that functions as the etching stopper layer, and the second electrode layer 7a making up the storage capacitance 55. Therefore, in the embodiment, there is no need to deposit thickly a special thick metal for the plug.

Furthermore, in the embodiment, the pixel electrode 9a may be formed on the plane surface, since the surface 7s of the conduction section 7t and the surface 450 of the inter-layer insulating film 45, which adjoin each other in succession, are at the same level. Therefore, the surface of the pixel electrode 9a is made to be plane. Therefore, the oriented film 16 may be formed on the plane surface of the pixel electrode 9a, and thus the oriented film 16 may be formed in a suitable manner. Furthermore, the pillar-shaped protrusion 440 is formed at the position overlapping the first electrode layer 5a and the data line 6a, when viewed from above. For this reason, since the pillar-shaped protrusion 440 is positioned over the film-thick portion of the first electrode layer 5a and the film-thick portion of the data line 6a, the conduction section 7t is easy to expose on the surface of the inter-layer insulating film 45. This provides a condition suitable for the formation of the contact portion 9t of the pixel electrode 9a.

Other Effects of the Embodiment

Figure 6A:
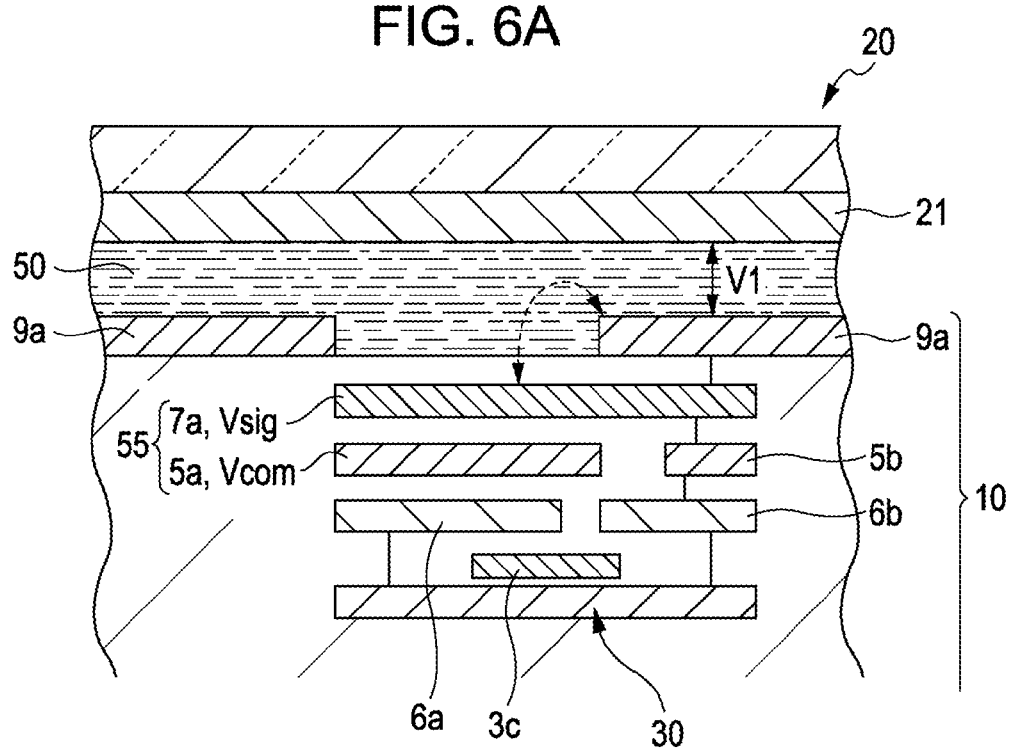
FIGS. 6A and 6B are explanatory views showing the effects of the electro-optical device to which the aspect of the invention is applied.
Figure 6B:
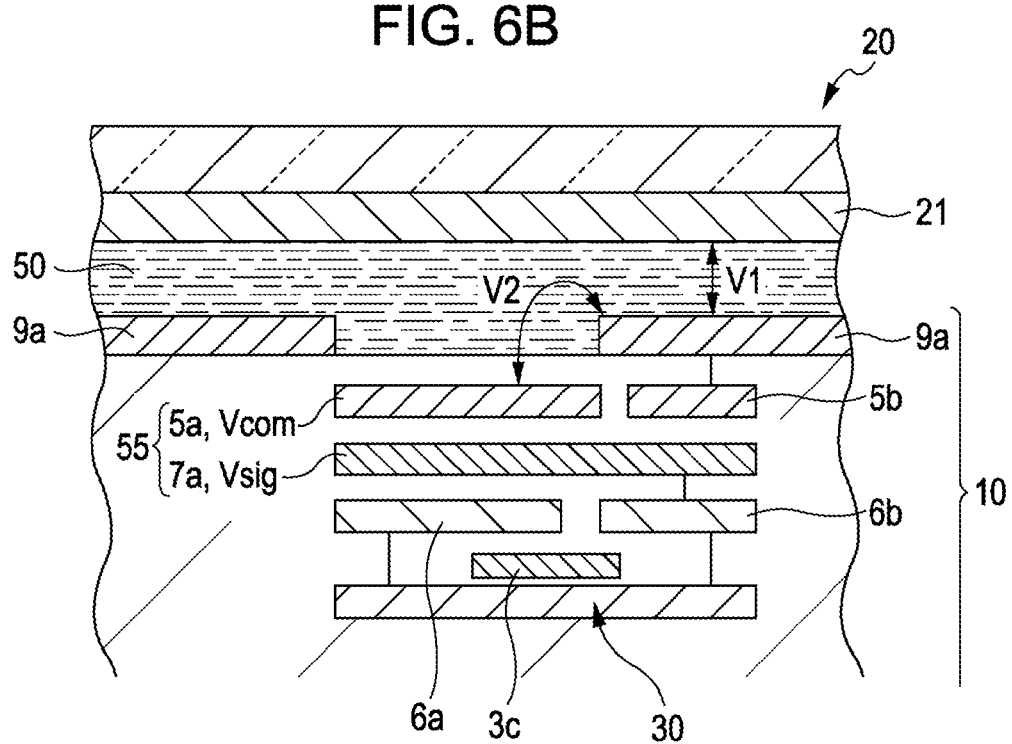

FIGS. 6A and 6B are explanatory views showing the effects of the electro-optical device 100 to which the aspect of the invention is applied. FIG. 6A is a schematic configuration of the pixel electrodes in the electro-optical device 100. FIG. 6B is a schematic configuration of the pixel electrodes in the comparative example.

As shown in FIGS. 3A, 3B, in the electro-optical device 100 according to the embodiment, the second electrode layer 7a (the conductive layer) and the first electrode layer 5a (the capacity electrode layer) are provided in an area overlapping the area (the second inter-pixel area 10f) between the pixel electrodes 9a adjacent in the X direction. However, as shown in FIG. 6A, in this embodiment, the second electrode layer 7a is positioned over the first electrode layer 5a in the upward direction (near the pixel electrode 9a). For this reason, the orientation of the liquid crystal layer 50 is not disturbed by electric potential occurring between the pixel electrode 9a and the first electrode layer 5a.

More specifically, as shown in FIGS. 6A and 6B, in the electro-optical device 100, the orientation of liquid crystal molecules of the liquid crystal layer 50 is controlled by a longitudinal electric field (indicated by an arrow V1) between the pixel electrode 9a in the element substrate 10 and the common electrode 21 to which the common potential Vcom is applied in the opposite substrate 20, and optical modulation is performed on each pixel. At this point, the common potential Vcom is applied to the first electrode layer 5a and the potential Vsig is applied to the second electrode layer 7a. The potential Vsig applied to the second electrode layer 7a is the same as that applied to the pixel electrode 9a. For this reason, as is shown in the comparative example of FIG. 6B, when the first electrode layer 5a is positioned over second electrode layer 7a in the upward direction (near the pixel electrode 9a), an unnecessary electric field (indicated by an arrow V2) occurs between the highest portion of the pixel electrode 9a and the first electrode layer 5a, and thus disturbance of potential distribution occurs near the highest portion of the pixel electrode 9a.

In contrast, in the embodiment, the second electrode layer 7a is positioned over the first electrode layer 5a in the upward direction (near the pixel electrode 9a). Since the unnecessary electric field, indicated by the arrow V2, does not occur for this reason, the disturbance of the potential distribution does not occur near the highest portion of the pixel electrode 9a, and thus the distribution of liquid crystal molecules may be controlled even near the highest portion of the pixel electrode 9a, in a suitable manner. Even though an electric field occurs in an area between the pixel electrode 9a and the second electrode layer 7a (the area is positioned near the pixel electrode 9a), this electric field does not cause critical effects, because potential difference is small, compared to the potential (common potential Vcom) applied to the first electrode layer 5a.

Other Embodiments

In the embodiment, the example is above described in which the aspect of the invention is applied to the transmission-type electro-optical device 100, but the aspect of the invention may be applied to the reflection-type electro-optical device 100.

Furthermore, the example is described in which the aspect of the invention is applied to the electro-optical device 100, but the aspect of the invention may be applied to other electro-optical devices, such as an organic electroluminescence device.

Example of Equipping Electronic Device with Electro-Optical Device

Configuration Example of Projection-Type Display Device and Optical Unit

Figure 7A:
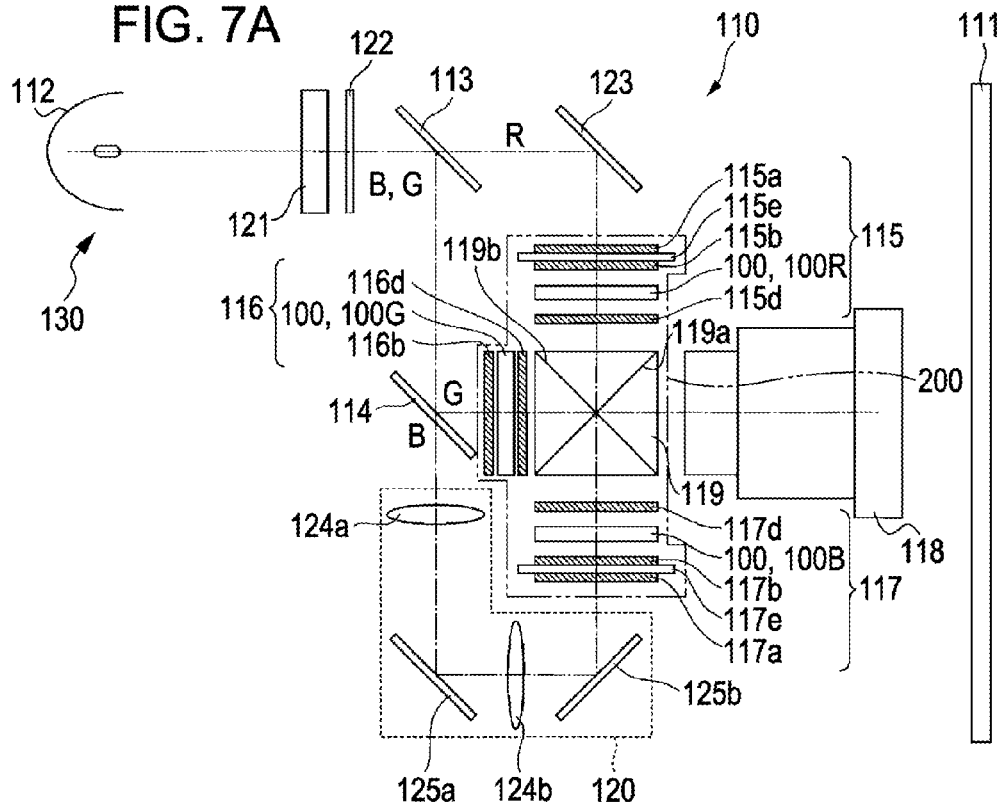
FIGS. 7A and 7B are diagrams illustrating schematic configurations of a projection-type display device to which the aspect of the invention is applied, and an optical unit.
Figure 7B:
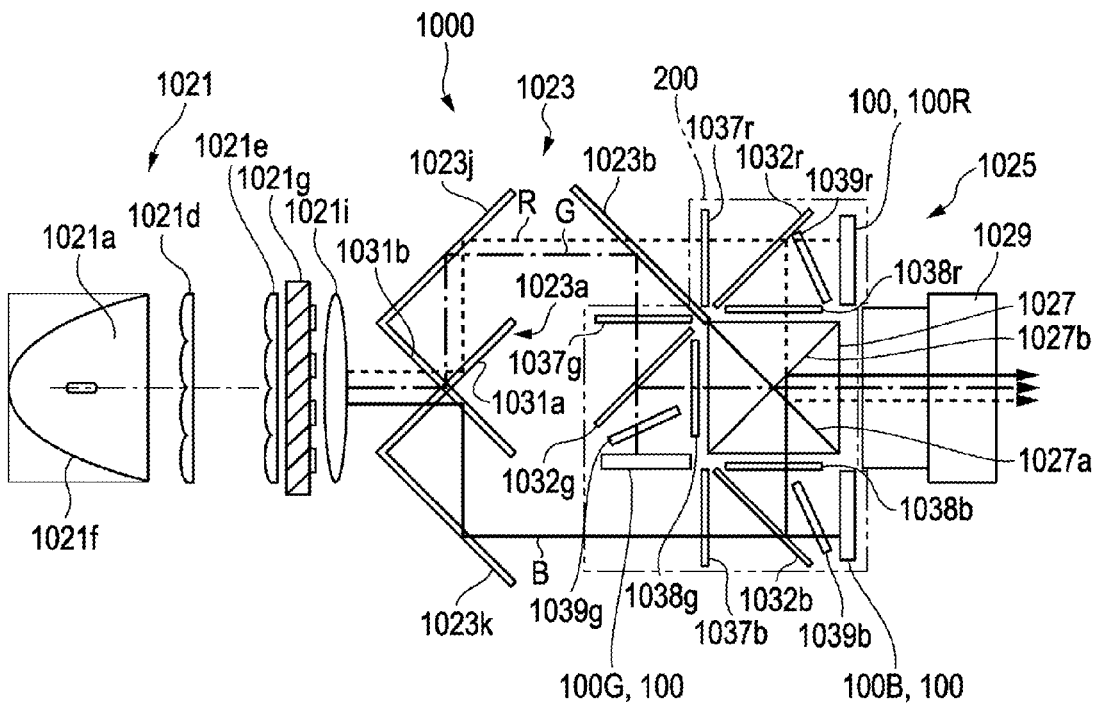

FIGS. 7A and 7B are schematic configurations of a projection-type display device to which the aspect of the invention is applied and an optical unit. FIG. 7A is a schematic configuration of the projection-type display device using the transmission-type electro-optical device. FIG. 7B is a schematic configuration of the projection-type display device using the reflection-type electro-optical device.

A projection-type display device 110, as shown in FIG. 7A, is an example of using a transmission-type liquid crystal panel as a liquid crystal panel. In contrast, the projection-type display device 1000, as shown in FIG. 7B, is an example of using the reflection-type liquid crystal panel as a liquid crystal panel. However, as is below described, the projection-type display device 110 includes a light source unit 130, a plurality of electro-optical devices 100 receiving light of different wavelength regions from the light source unit 130, a cross dichroic prism 119 (an optical system of photosynthesis) synthesizing and emitting the light from the plurality of the electro-optical devices 100, and a projection optical system 118 projecting the light synthesized by the cross dichroic prism 119. Likewise, a projection-type display device 1000 includes a light source unit 1021, a plurality of electro-optical devices 100 receiving light of different wavelength regions from the light source unit 1021, a cross dichroic prism 1027 (the optical system of photosynthesis) synthesizing and emitting the light from the plurality of the electro-optical devices 100, and a projection optical system 1029 projecting the light synthesized by the cross dichroic prism 1027. Furthermore, an optical unit 200, including the electro-optical device 100 and the cross dichroic prism 119 (the optical system of photosynthesis), is used in the projection-type display device 110. Likewise, an optical 200, including the electro-optical device 100 and the cross dichroic prism 1027 (the optical system of photosynthesis), is used in the projection-type display device 1000.

First Example of Projection-Type Display Device

The projection-type display device 110, as shown in FIG. 7A, projects light onto a screen 111 prepared by a viewer, and the viewer sees the light reflected by the screen 111. The projection-type display device 110 is a so-called screen-reflected type. The projection-type display device 110 includes a light source unit 130 including a light source 112, dichroic mirrors 113 and 114, liquid crystal light valves 115, 116, and 117, a projection optical system 118, a cross dichroic prism 119 (the optical system of photosynthesis), and a relay system 120.

The light source 112 includes an extra-high pressure mercury lamp supplying light including red light R, green light G, and blue light B. The dichroic mirror 113 has a configuration that allows red light R from the light source 112 to penetrate, but reflects green light G and blue light B from the light source 112. Furthermore, the dichroic mirror 114 has a configuration that allows blue light B, reflected by the dichroic mirror 113, to penetrate, but reflects green light G, reflected by the dichroic mirror 113. In this way, the dichroic mirrors 113 and 114 make up a color separation optical system that separates light emitted from the light source 112 into red light R, green light G, and blue light B.

At this point, an integrator 121 and a polarization conversion element 122 are arranged in this order from the light source 112 between the dichroic mirror 113 and the light source 112. The integrator 121 has a configuration that makes uniform the illumination distribution of light emitted from the light source 112. Furthermore, the polarization conversion element 122 has a configuration that converts light emitted from the light source 112 into polarized light having a specific vibration direction, such as s polarized light.

The liquid crystal light valve 115 is a transmission-type electro-optical device that modulates red light R that penetrates the dichroic mirror 113, but reflects off a reflecting mirror 123, in response to an image signal. The liquid crystal light valve 115 includes a $\lambda/2$ phase difference plate 115a, a first polarizing plate 115b, the electro-optical device 100 (a liquid crystal panel 100R for red), and a second polarization 115d. At this point, the red light R that is incident on the liquid crystal light valve 115 does not experience any change in polarized light and therefore maintains s polarized light even though the red light R penetrated the dichroic mirror 113.

The $\lambda/2$ phase difference plate 115a is an optical element that converts s polarized light, that is incident on the liquid crystal light valve 115, into p polarized light. Furthermore, the first polarizing plate 115b is a polarizing plate that blocks s polarized light and allows p polarized light to penetrate. The electro-optical device 100 (a liquid crystal panel 100R for red) has a configuration that converts p polarized light into s polarized light (circularly polarized light or elliptically polarized light in the case of a half tone), by modulation that is in response to the image signal. In addition, the second polarizing plate 115d is a polarizing plate that blocks p polarized light and allows s polarized light to penetrate. Therefore, the liquid crystal light valve 115 has a configuration that modulates red light R in response to the image signal, and emits the modulated red light R toward the cross dichroic prism 119.

The $\lambda/2$ phase difference plate 115a and the first polarizing plate 115b is arranged in such a manner as to be in contact with a glass plate 115e of translucency that does not convert polarized light, and therefore the $\lambda/2$ phase difference plate 115a and the first polarizing plate 115b may be prevented from warping due to generated heat.

The liquid crystal light valve 116 is a transmission-type electro-optical device that modulates green light G that reflected off the dichroic mirror 114 after reflecting off the dichroic mirror 113, in response to the image signal. The liquid crystal light valve 116, like the liquid crystal light valve 115, includes a first polarizing plate 116b, the electro-optical device 100 (a liquid crystal panel 100G for green), and a second polarizing plate 116d. The green light G that is incident on the liquid crystal light valve 116, is s polarized light that reflected off the dichroic mirrors 113 and 114. The first polarizing plate 116b is a polarizing plate that blocks p polarized light and allows s polarized light to penetrate. Furthermore, the electro-optical device 100 (the liquid crystal panel 100G for green) has a configuration that converts s polarized light into p polarized light (circularly polarized light, or elliptically polarized light in a case of a half tune) by modulation that is in response to the image signal. The second polarizing plate 116d is a polarizing plate that blocks s polarized light and allows p polarized light to penetrate. Therefore, the liquid crystal light valve 116 has a configuration that modulates green light G in response to the image signal, and emits the modulated green light G toward the cross dichroic prism 119.

The liquid crystal light valve 117 is a transmission-type electro-optical device that modulates blue light B that reflected off the dichroic mirror 113, penetrated the dichroic mirror 114, and then passed through the relay system 120, in response to the image signal. The liquid light valve 117, like the liquid crystal light valves 115 and 116, includes a $\lambda/2$ phase difference plate 117a, a first polarizing plate 117b, the electro-optical device 100 (a liquid crystal panel 100B for blue), and a second polarizing plate 117d. At this point, the blue light B that is incident on the liquid light valve 117 becomes s polarized light, because the blue light B that reflected off the dichroic mirror 113 and penetrated the dichroic mirror 114 reflects off two reflecting mirrors 125a and 125b, which are described below, of the relay system 120.

The $\lambda/2$ phase difference plate 117a is an optical element that converts s polarized light that was incident on the liquid light valve 117, into p polarized light. Furthermore, the first polarizing plate 117b is a polarizing plate that blocks s polarized light and allows p polarized light to penetrate. The electro-optical device 100 (the liquid crystal panel 100B for blue) has a configuration that converts p polarized light into s polarized light (circularly polarized light, or elliptically polarized light in a case of a half tune) by modulating p polarized light in response to the image signal. In addition, the second polarizing plate 117d is a polarizing plate that blocks p polarized light and allows s polarized light to penetrate. Therefore, the liquid crystal light valve 117 has a configuration that modulates blue light B in response to the image signal, and emits the modulated blue light B toward the cross dichroic prism 119. The $\lambda/2$ phase difference plate 117a and the first polarizing plate 117b are arranged in such a manner as to be in contact with the glass plate 117e.

The relay system 120 includes relay lenses 124a and 124b, and reflecting mirrors 125a and 125b. The relay lenses 124a and 124b are provided to prevent optical loss that is due to a long optical path of blue light B. At this point, the relay lens 124a is arranged between the dichroic mirror 114 and the reflecting mirror 125a. Furthermore, the relay lens 124b is arranged between the reflecting mirrors 125a and 125b. The reflecting mirror 125a is arranged in such a manner as to reflect blue light B that penetrated the dichroic mirror 114 and was emitted from the relay lens 124a, toward the relay lens 124b. Furthermore, the reflecting mirror 125b is arranged in such a manner as to reflect blue light B that was emitted from the relay lens 124b, toward the liquid light valve 117.

The cross dichroic prism 119 is an optical system of color synthesis, in which the two dichroic films 119a and 119b cross at a right angle in an X shape. The dichroic film 119a reflects blue light B and allows green light G to penetrate. The dichroic film 119b reflects red light R and allows green light G to penetrate. Therefore, the cross dichroic prism 119 has a configuration that synthesizes red light R, green light G, and blue light B modulated in the liquid crystal light valves 115, 116, 117, respectively, and emits the synthesized red light R, green light G, and blue light B toward the projection optical system 118.

Light which is incident on the cross dichroic prism 119 from the liquid crystal light valves 115 and 117 is s polarized light, and light is p polarized light which is incident on the cross dichroic prism 119 from the liquid crystal light valve 116 is p polarized light. Light that is incident on the cross dichroic prism 119 is made to be different kinds of polarized light in this way, and thus light emitted from the liquid crystal light valves 115, 116, and 117 may be synthesized in the cross dichroic prism 119. Generally, each of the dichroic films 119a and 119b have excellent reflection transistor characteristic of s polarized light. For this reason, red light R and blue light B that is reflected by the dichroic films 119a and 119b is determined as s polarized light, and green light G that penetrates the dichroic films 119a and 119b is determined as p polarized light. The projection optical system 118 has a configuration that includes a projection lens (not shown) and projects light synthesized by the cross dichroic prism 119 onto the screen 111.

Second Example of Projection-Type Display Device

The projection-type display device 1000, as shown in FIG. 7B, includes a light source unit 1021 generating light source light, a color separation light guide optical system 1023 separating the light source light emitted from the light source unit 1021 into 3 color light of red light R, green light G, and blue light B, and a light modulating unit 1025 that is illuminated by each light source light emitted from the color separation light guide optical system 1023. Furthermore, the projection-type display device 1000 includes a cross dichroic prism 1027 (the optical system of photosynthesis) synthesizing image light emitted from the light modulating unit 1025, and a projection optical system 1029 projecting the image light passing through the cross dichroic prism 1027 onto a screen (not shown).

In this projection-type display device 1000, the light source unit 1021 includes a light source 1021a, a pair of fly eye optical systems 1021d and 1021e, a polarized light conversion member 1021g and a superimposing lens 1021i. In the embodiment, the light source unit 1021 includes a reflector 1021f with paraboloid surface and emits parallel light. Each of the fly eye optical systems 1021d and 1021e is made up of a plurality of element lens arranged in the matrix on the surface intersecting a system optical axis. Light-source light is separated by the plurality of the element lens, and then is individually concentrated and radiated. The polarized light conversion member 1021g converts the light-source light emitted from the fly eye optical system 1021e into a p polarized light component only, for example, in parallel with the drawing, and supply the p polarized light component to the optical system, down the optical path. The superimposing lens 1021i enables each of the electro-optical devices 100, provided in the light modulating unit 1025, to perform superimposed lighting in a uniform manner, by converging properly the light-source light, as a whole, that passed through the polarized light conversion member 1021g.

The color separation light guide optical system 1023, includes a cross dichroic mirror 1023a, a dichroic mirror 1023b, and reflection mirrors 1023j and 1023k. In the color separation light guide optical system 1023, almost white light-source light from the light source unit 1021 is incident on the cross dichroic mirror 1023a. The red light R, reflected by the first dichroic mirror 1031a, as one element making up the cross dichroic mirror 1023a, reflects off the reflection mirror 1023j, penetrates the dichroic mirror 1023b. Then, the red light R, polarized light as it is, is incident on the electro-optical device 100 (a liquid crystal panel 100R for red), through a polarizing plate 1037r, which is opposite to incident light, a wire grid polarizing plate 1032r, which allows p polarized light to penetrate, but reflects s polarized light, and an optical compensation plate 1039r.

Furthermore, the green light G, reflected by the first dichroic mirror 1031a, reflects off the reflection mirror 1023j, and then reflects off the dichroic mirror 1023b as well. Then, the green light G, remaining as p polarized light, is incident on the electro-optical device 100 (a liquid crystal panel 100G for green), through a polarized plate 1037g, which is opposite to incident light, a wire grid polarizing plate 1032g, which allows p polarized light to penetrate, but reflects s polarized light, and an optical compensation plate 1039g.

In contrast, the blue light B, reflected by the second dichroic mirror 1031b, as the other element making up the cross dichroic mirror 1023a, reflects off the reflection mirror 1023k. Then, the blue light B is incident on the electro-optical device 100 (the liquid crystal panel 100B for blue), through a polarizing plate 1037b, which is opposite to incident light, a wire grid polarizing plate 1032b, which allows p polarized light to penetrate, but reflects s polarized light, and an optical compensation plate 1039b. The optical compensation plates 1039r, 1039g, and 1039b enhance the characteristics of the liquid crystal layer in a compensating manner, by controlling the incident light that is incident on the electro-optical device 100 and the polarized state of emitted light, in an optical manner.

In the projection-type display device 1000 with this configuration, each of light of 3 colors, incident after passing through the optical compensation plates 1039r, 1039g, and 1039b, is modulated in the corresponding electro-optical device 100. At this point, among modulated light emitted from the electro-optical device 100, component light of s polarized light reflects off the wire grid polarizing plates 1032r, 1032g, and 1032b, and is incident on the cross dichroic prism 1027, through emitting-side polarizing plates 1038r, 1038g, and 1038b. A first dielectric multi-layered film 1027a and a second dielectric multi-layered film 1027b, which intersect in an X shape, are formed in an X shape on the cross dichroic prism 1027. The first dielectric multi-layered film 1027a on one side reflects red light R, and the second dielectric multi-layered film 1027b on the other side reflects blue light B. Therefore, light of 3 colors is synthesized in the cross dichroic prism 1027, and is emitted to the projection optical system 1029. Then, the projection optical system 1029 projects image light of color synthesized in the cross dichroic prism 1027 on a given scale onto the screen (not shown).

Other Projection-Type Display Devices

The projection-type display device may use an LED light source emitting each light of color as the light source unit, and have a configuration that provides light of color emitted from this LED light source for a separate liquid crystal device.

Other Electronic Devices

The electro-optical device 100 to which the aspect of the invention is applied, may serve as a direct-view display device for an electronic device, such as a portable telephone, a PDA (Personal Digital Assistants), a digital camera, a liquid crystal television, a car navigation device, a television telephone, a POS terminal, a device equipped with a touch panel, and others.

What is claimed is:

1. An electro-optical device comprising:
   a pixel electrode provided over one side of a substrate;
   a conductive layer provided between the substrate and the pixel electrode, the conductive layer including a conduction section protruding toward the pixel electrode;
   a relay electrode provided between the substrate and the conductive layer;
   a first insulating film provided between the substrate and the pixel electrode, the first insulating film having a protrusion protruding toward the pixel electrode and an opening overlapping the relay electrode; and a second insulating film provided between the conductive layer and the pixel electrode;

wherein the pixel electrode is electrically connected to the conduction section, and the conduction section is electrically connected to the relay electrode, wherein the protrusion of the first insulating film is pillar-shaped having an upper surface nearest to the pixel electrode, and a pair of side surfaces sloping from the upper surface away from the pixel electrode, and wherein the conduction section of the conductive layer covers the upper surface and the pair of side surfaces of the protrusion.

2. The electro-optical device according to claim 1, wherein a surface of the conduction section facing the pixel electrode and a surface of the second insulating film facing the pixel electrode make up a continuous surface.

3. A projection-type display device comprising:
the electro-optical device according to claim 2;
a light source unit emitting light to be incident on the electro-optical device; and
a projection optical system projecting light modulated by the electro-optical device.

4. The electro-optical device according to claim 1, further comprising:
a capacity electrode layer provided between the conductive layer and the substrate; and
a dielectric layer provided between the capacity electrode layer and the conductive layer;
wherein a storage capacitance is formed by the capacity electrode layer, the dielectric layer, and the conductive layer.

5. The electro-optical device according to claim 4, wherein the first insulating film is provided between the capacity electrode layer and the conductive layer, and an opening is provided in an area where the capacity electrode layer and the conductive layer overlap each other when viewed from above the one side of the substrate.

6. The electro-optical device according to claim 5, wherein the conductive layer and capacity electrode layer are provided in an area that overlaps an area between the pixel electrode and another pixel electrode that is adjacent to the pixel electrode when viewed from above the one side of the substrate.

7. A projection-type display device comprising:
the electro-optical device according to claim 5;
a light source unit emitting light to be incident on the electro-optical device; and
a projection optical system projecting light modulated by the electro-optical device.

8. A projection-type display device comprising:
the electro-optical device according to claim 6;
a light source unit emitting light to be incident on the electro-optical device; and
a projection optical system projecting light modulated by the electro-optical device.

9. The electro-optical device according to claim 4, wherein the protrusion is provided in a position that overlaps the capacity electrode layer when viewed from above the one side of the substrate.

10. A projection-type display device comprising:
the electro-optical device according to claim 9;
a light source unit emitting light to be incident on the electro-optical device; and
a projection optical system projecting light modulated by the electro-optical device.

11. A projection-type display device comprising:
the electro-optical device according to claim 4;
a light source unit emitting light to be incident on the electro-optical device; and
a projection optical system projecting light modulated by the electro-optical device.

12. The electro-optical device according to claim 1, wherein a liquid crystal layer is provided between the substrate and an opposite substrate that is disposed opposite to the substrate.

13. A projection-type display device comprising:
the electro-optical device according to claim 12;
a light source unit emitting light to be incident on the electro-optical device; and
a projection optical system projecting light modulated by the electro-optical device.

14. A projection-type display device comprising:
the electro-optical device according to claim 1;
a light source unit emitting light to be incident on the electro-optical device; and
a projection optical system projecting light modulated by the electro-optical device.

15. An electronic device comprising the electro-optical device according to claim 1.

16. An electro-optical device comprising:
a pixel electrode provided over one side of a substrate;
a conductive layer provided between the substrate and the pixel electrode, the conductive layer including a conduction section protruding toward the pixel electrode;
a relay electrode provided between the substrate and the conductive layer;
a first insulating film provided between the substrate and the pixel electrode, the first insulating film having a protrusion protruding toward the pixel electrode and an opening overlapping the relay electrode; and
a second insulating film provided between the conductive layer and the pixel electrode;
wherein the pixel electrode is electrically connected to the conduction section, and the conduction section is electrically connected to the relay electrode, and
a surface of the conduction section facing the pixel electrode and a surface of the second insulating film facing the pixel electrode make up a continuous surface.

17. An electro-optical device comprising:
a pixel electrode provided over one side of a substrate;
a conductive layer provided between the substrate and the pixel electrode, the conductive layer including a conduction section in contact with the pixel electrode;
a relay electrode provided between the substrate and the conductive layer;
a first insulating film provided between the substrate and the pixel electrode, the first insulating film having a protrusion protruding toward the pixel electrode and an opening overlapping the relay electrode; and
a second insulating film provided between the conductive layer and the pixel electrode;
wherein
the pixel electrode is electrically connected to the conductive layer, and the conductive layer is electrically connected to the relay electrode,
the conduction section overlaps the protrusion of the first insulating film, and
the conduction section contacts the pixel electrode in a region between the protrusion of the first insulating film and the pixel electrode.

* * * * *